US008023414B2

(12) United States Patent
Soja-Molloy et al.

(10) Patent No.: US 8,023,414 B2
(45) Date of Patent: Sep. 20, 2011

(54) SYSTEM AND METHOD FOR ROUTING PACKET TRAFFIC

(75) Inventors: Sherry Soja-Molloy, Allen Park, MI (US); Mark A. Elias, Eastpointe, MI (US); Brad J. Bledsoe, Euless, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 12/705,740

(22) Filed: Feb. 15, 2010

(65) Prior Publication Data

US 2010/0142532 A1 Jun. 10, 2010

Related U.S. Application Data

(63) Continuation of application No. 11/549,275, filed on Oct. 13, 2006, now Pat. No. 7,693,073.

(51) Int. Cl.
*H04L 12/26* (2006.01)
*H04L 12/28* (2006.01)
*H04L 12/56* (2006.01)

(52) U.S. Cl. .................. 370/238; 370/392; 370/395.31; 370/395.42; 370/401; 370/409

(58) Field of Classification Search .................. 370/239, 370/238, 395.31, 401, 409
See application file for complete search history.

(56) References Cited

U.S. PATENT DOCUMENTS 7,440,451 B2 * 10/2008 Letney et al. ................ 370/389
2003/0123457 A1 7/2003 Koppol
2004/0260818 A1 * 12/2004 Valois et al. ................. 709/229
2004/0267875 A1 * 12/2004 Hennessey et al. ........... 709/200
2005/0102423 A1 5/2005 Pelavin et al.
2005/0129001 A1 * 6/2005 Backman et al. ............. 370/352
2005/0259664 A1 11/2005 Vasseur et al.
2006/0215578 A1 * 9/2006 Andrapalliyal et al. ...... 370/254
2006/0233181 A1 * 10/2006 Raszuk et al. ................ 370/401
2007/0008878 A1 1/2007 Filsfils et al.
2007/0097991 A1 * 5/2007 Tatman .................... 370/395.53
2007/0177596 A1 8/2007 Bapat et al.
2007/0226325 A1 * 9/2007 Bawa et al. .................. 709/223
2007/0248091 A1 10/2007 Khalid et al.
2008/0095157 A1 4/2008 McCabe
2008/0199003 A1 * 8/2008 Hennessey et al. ............. 380/30

* cited by examiner

*Primary Examiner* — Marsha D Banks Harold
*Assistant Examiner* — Saad Hassan

(57) ABSTRACT

A system and method are disclosed for routing packet traffic. A system that incorporates teachings of the present disclosure may include, for example, a Provider Edge (PE) router having a routing element that routes packet traffic between a plurality of autonomous systems according to one or more Virtual Routing and Forwarding (VRF) tables each having a plurality of Enhanced Interior Gateway Routing Protocol (EIGRP) Autonomous System (AS) numbers. Other embodiments are disclosed.

10 Claims, 3 Drawing Sheets

100

SYSTEM AND METHOD FOR ROUTING PACKET TRAFFIC

CROSS-REFERENCE TO RELATED APPLICATIONS

This application is a Continuation application of U.S. patent application Ser. No. 11/549,275, entitled "SYSTEM AND METHOD FOR ROUTING PACKET TRAFFIC," filed Oct. 13, 2006, now U.S. Pat. No. 7,693,073, issued Apr. 6, 2010, and assigned to the same assignee as this application. The aforementioned patent application is expressly incorporated herein, in its entirety, by reference.

FIELD OF THE DISCLOSURE

The present disclosure relates generally to packet switched networks, and more specifically to a system and method for routing packet traffic.

BACKGROUND

In traditional enterprise networks that utilize frame-relay, ATM (Asynchronous Transfer Mode), or private lines, enterprise customers have the ability to run multiple Enhanced Interior Gateway Routing Protocol (EIGRP) autonomous systems in their networks. As enterprise customers transition to Multi-Protocol Label Switching (MPLS) Virtual Private Networks (VPNs), the ability to utilize multiple EIGRP autonomous systems in a single Virtual Routing and Forwarding (VRF) table is not possible at the present time. To overcome this shortcoming service providers have created multiple VRF tables, which link the customer sites through the manipulation of route targets, thereby producing an extranet implementation.

A need therefore arises for a system and method for routing packet traffic that overcomes the aforementioned complications in the art.

DETAILED DESCRIPTION

Embodiments in accordance with the present disclosure provide a system and method for routing packet traffic.

In a first embodiment of the present disclosure, a Provider Edge (PE) router can have a routing element that routes packet traffic between a plurality of autonomous systems according to one or more Virtual Routing and Forwarding (VRF) tables each having a plurality of Enhanced Interior Gateway Routing Protocol (EIGRP) Autonomous System (AS) numbers. The routing element can have a communications interface for processing packets from a plurality of network elements, a memory for storing the VRF table and routing information, a controller that manages operations of the routing element according to protocols conforming to EIGRP and a Border Gateway Protocol (BGP).

In a second embodiment of the present disclosure, a method can have the step of routing packet traffic according to one or more VRF tables each having a plurality of EIGRP AS numbers.

In a third embodiment of the present disclosure, a Customer Edge (CE) router can have a routing element that submits to a PE router a routing update for updating one or more EIGRP AS entries in one or more VRF tables stored in the PE.

In a fourth embodiment of the present disclosure, a policy management system can have a policy element that manages packet traffic between EIGRP autonomous systems according to a data management policy, wherein the policy element receives the packet traffic from a PE router that routes said packet traffic according to a VRF table having a plurality of EIGRP AS numbers.

Figure 1:
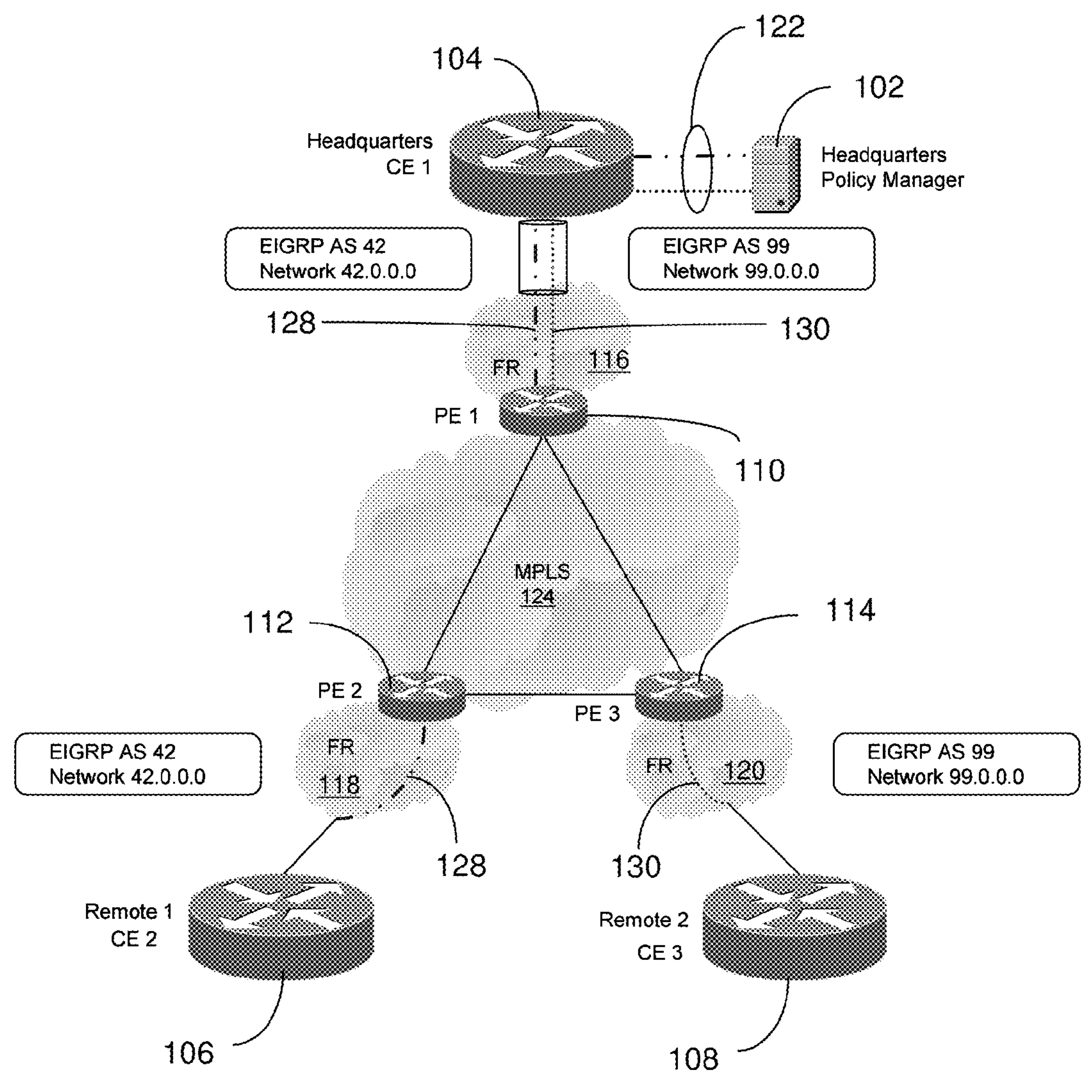
FIG. 1 depicts an exemplary embodiment of a communication system.

FIG. 1 depicts an exemplary embodiment of a communication system 100. The communication system 100 comprises Customer Edge (CE) routers 104-108 coupled to Frame Relay (FR) networks 116-120, which in turn are coupled to Provider Edge (PE) routers 110-114 linked to a packet switching network having a plurality of network elements operating according to a Multi-Protocol Label Switching (MPLS) standard ("MPLS network 124"). The MPLS network 124 utilizes BGP (Border Gateway Protocol) to exchange routing information between said network elements. The MPLS network 124 provides full mesh connectivity between the PE routers 110-114, for exchanging packet traffic between the CE routers 104-108.

Figure 2:
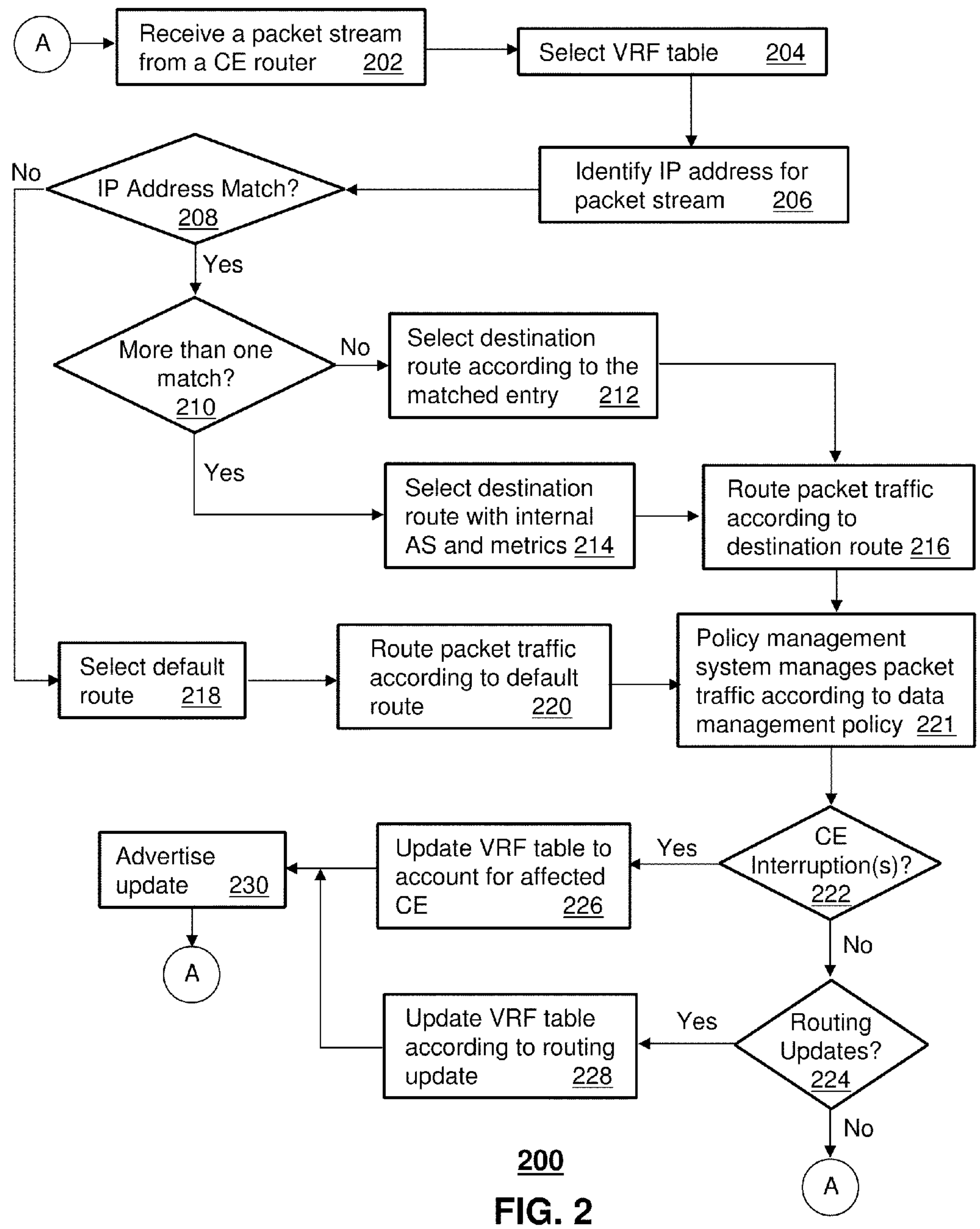
FIG. 2 depicts an exemplary method operating in the communication system.

In the present illustration, an enterprise customer situated at a headquarters site operates two Enhanced Interior Gateway Routing Protocol (EIGRP) Autonomous Systems (AS). CE routers 104-108 in this illustration belong to the same Virtual Private Network (VPN). EIGRP AS 42 corresponds to an autonomous system existing between the headquarters CE router 104, the service provider's EIGRP AS incorporated into the MPLS network 124, and the CE router 106 of Remote site 1 (depicted by route 128). Similarly EIGRP AS 99 corresponds to a second autonomous system existing between the headquarters CE router 104 and the CE router 108 of Remote site 2 (depicted by route 130). The headquarters CE router 104 can be coupled to a policy management system 102 that manages packet traffic between the EIGRP AS 42 and 99. The functions of the aforementioned network elements can be described by an exemplary method 200 operating in the communication system 100 as depicted in FIG. 2.

Method 200 assumes that PE router 110 has a number of Virtual Routing and Forwarding (VRF) tables one of which is associated with CE router 104. Each VRF table has a plurality of IP network addresses, and each IP network address has a corresponding EIGRP AS number, routing metrics, and a label path route—among other possible entries. To exchange packet traffic between EIGRP AS 42 and 99, one or more IP addresses corresponding to CE router 104 stored in the VRF table of PE router 110 will be associated with EIGRP AS 42. Similarly, one or more other IP addresses will be associated with EIGRP AS 99 in the same VRF table. By including both EIGRP AS numbers (42, 99) in the same VRF table, PE router 110 can be configured to exchange packet traffic between the autonomous systems illustrated in FIG. 1.

To manage the packet traffic exchange between EIGRP AS 42 and 99, PE Router 110 is the only router with a VRF table having one or more IP addresses associated with AS 42 and 99, respectively. Accordingly, PE routers 112-114 have VRF tables with only their respective AS numbers (i.e., 42 and 99). If an enterprise customer does not desire to centralize packet traffic management at PE router 110 for policy management purposes, then PE router 112 can have a VRF table with one or more IP addresses corresponding to CE router 106 that are associated with EIGRP AS 42, and one or more other IP addresses associated with EIGRP AS 99 in the same VRF table. The same can be said of PE router 114. In this alternative embodiment, redundancy exists between the PE routers 110-114 for exchanging packet traffic between EIGRP AS 42 and 99.

For the purposes of describing method 200, it is assumed that policy management is a desired feature of the enterprise customer. With this in mind, method 200 begins with step 202 in which a select one of the PE routers receives packet traffic from one of its corresponding CE routers. Step 202 can apply to any of the PE routers 110-114. For the present example, it will be assumed that this transaction occurs between CE router 106 and PE router 112. Upon receiving the packet traffic, PE router 112 in step 204 selects a VRF table associated with CE router 106 to process the packet traffic. From the packet traffic PE router 112 identifies in step 206 an IP address associated with the packet stream. The PE router 112 then checks in step 208 whether the IP address matches an address in the VRF table associated with CE router 106.

If there is no match, the PE router 112 proceeds to step 218 where it selects a default route and routes the packet traffic accordingly in step 220. If the headquarters CE router 104 does not advertise its routes to PE router 112 (by way of PE router 110), a default route can be used at PE router 112 to direct the packet traffic to the headquarters CE router 104 and inevitably to the policy management system 102. If, however, the headquarters CE router 104 advertises its routing information to the PE router 112 and there's a match with the IP address in step 210, PE router 112 proceeds to step 212 where it selects a destination route according to the matched entry, and proceeds to route the packet traffic in step 216 according to said route.

If on the other hand there's more than one IP address match in the VRF table, the PE router 112 proceeds to step 214 where it selects a destination route with a bias for selecting an IP address associated with an internal autonomous system (in this example EIGRP AS 42) rather than an external autonomous system. The PE router 112 also looks to one or more metrics associated with each matched entry to break ties between two or more entries having an internal autonomous system. The metrics analyzed by the PE router 112 can include a metric for selecting a route utilizing the least amount of bandwidth, and/or a route having the lowest delay (e.g., minimum hops between the source and destination IP address supplied by CE router 106). Once the destination route has been determined, the PE router 112 proceeds to step 216 and routes said packet traffic accordingly.

After the packet traffic has been routed according to either the default route or destination route, the PMS 102 manages in step 221 the packet traffic it has received from PE router 110 and CE router 104 respectively according to a data management policy. A policy element of the PMS 102 can monitor the packet traffic for one or more violations of the data management policy, restrict flow of a portion of the packet traffic between EIGRP AS 42 and 99 upon detecting said one or more violations, and/or redirect the portion of the packet traffic between the EIGRP AS 42 and 99 according to the data management policy. These are but a few examples of how the PMS 102 can manage the packet traffic between autonomous systems. Other embodiments suitable to the present disclosure can also be applied.

In step 222, the PE router 112 can be programmed to check for interruptions with CE router 106. An interruption can represent a period of time in which the CE router 106 has limited or no operation due to maintenance or a malfunction. If an interruption is detected, the PE router 112 proceeds to step 226 where it removes one or more EIGRP AS entries in the VRF table associated with the CE router 106, advertises in step 230 said update to one or more network elements in the communication system 100 by common means (e.g., a route reflector), and returns to step 202 where it repeats the foregoing steps.

If no interruption is detected, the PE router 112 proceeds to step 224 where it checks for routing updates received from the CE router 106. If none are present, the PE router 112 proceeds to step 202 and repeats the aforementioned process. If an update is received, the VRF table associated with the CE router 106 is updated in step 228 and advertised to the communication system 100 in step 230 as described before.

Upon reviewing the foregoing embodiments of the present disclosure, it would be evident to an artisan with ordinary skill in the art that said embodiments can be modified, reduced, or enhanced without departing from the scope and spirit of the claims described below. For example, a number of steps in method 200 can be rearranged without departing from the objective of the present disclosure. Similarly, the configuration in FIG. 1 can be rearranged, augmented, or modified in a number of ways within the scope of operations described by method 200. Further the policy management portion of method 200 can be removed without altering the scope of the claims below. Other modifications are also possible. Accordingly, the reader is directed to the claims below for a fuller understanding of the breadth and scope of the present disclosure.

Figure 3:
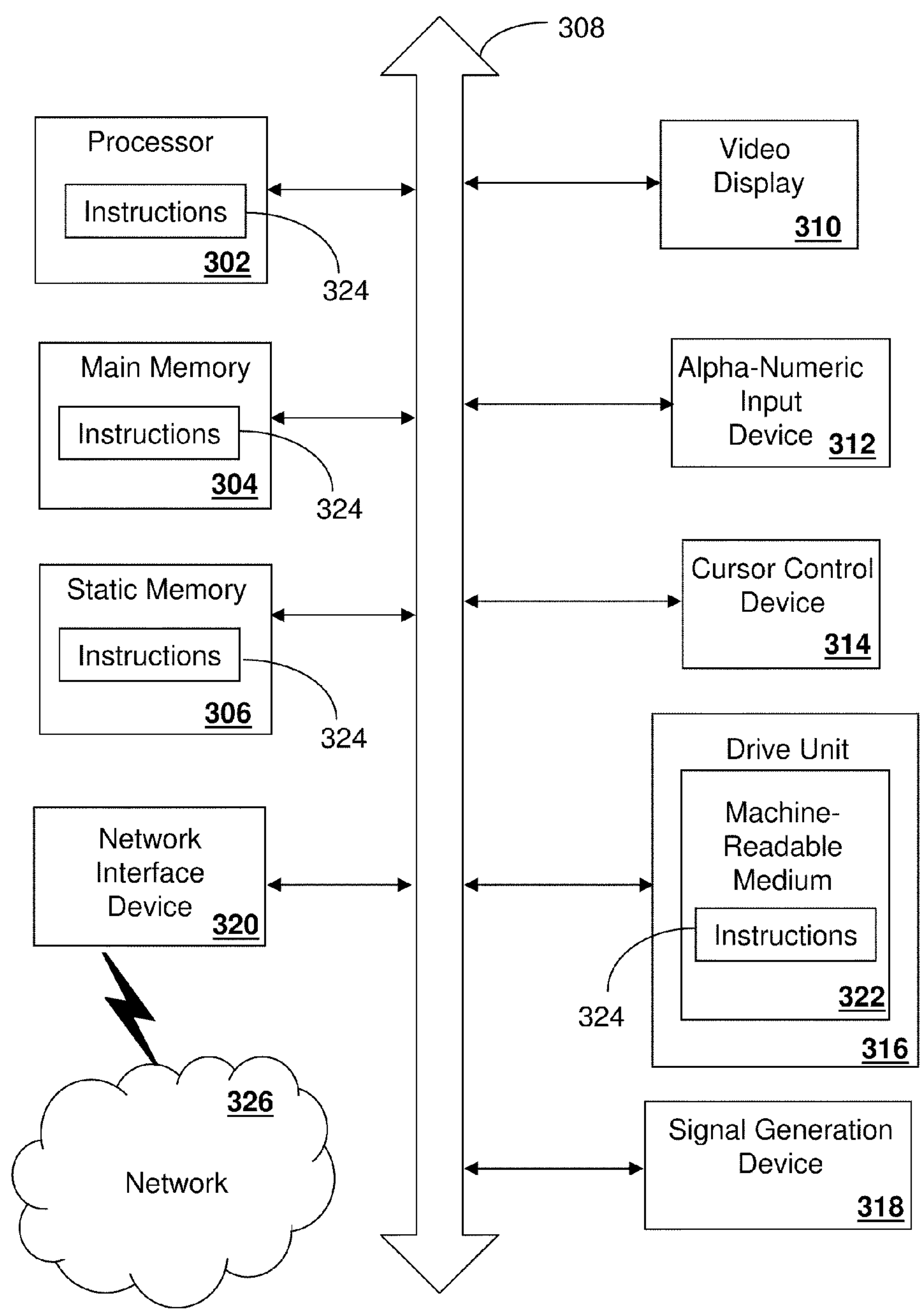
FIG. 3 is a diagrammatic representation of a machine in the form of a computer system within which a set of instructions, when executed, may cause the machine to perform any one or more of the methodologies discussed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A provider edge router, comprising a routing element that routes packet traffic between a plurality of autonomous systems according to one or more virtual routing and forwarding tables each having a plurality of enhanced interior gateway routing protocol autonomous system numbers, wherein the routing element comprises:

- a communications interface for processing packets from a plurality of customer edge routers;
- a memory for storing the virtual routing and forwarding table and routing information; and
- a controller that manages operations of the routing element according to protocols conforming to enhanced interior gateway routing protocol and border gateway protocol standards, wherein when the routing element detects an interruption in a select one of the customer edge routers, the interruption comprising limited or no operation of the select one of the customer edge routers, the routing element removes one or more enhanced interior gateway routing protocol autonomous system numbers from one of the virtual routing and forwarding tables associated with the affected customer edge router, and advertises the update of the virtual routing and forwarding table to one or more network elements of a communication system coupled to the provider edge router;

wherein when the routing element detects no interruption in the select one of the customer edge routers, the routing element checks for routing updates received from the select one of the customer edge routers, and if an update is received, the virtual routing and forwarding table associated with the select one of the customer edge routers is updated and advertised to the communication system; and wherein, upon receiving packet traffic from one of the customer edge routers, the routing element:

selects one of the virtual routing and forwarding tables according to its association with the customer edge router from which the packet traffic was received;

identifies an IP network address from the packet traffic;

detects one or more matching entries in the selected virtual routing and forwarding table that match the IP network address, at least one matching entry including an enhanced interior gateway routing protocol autonomous system numbers corresponding to an external autonomous system;

determines a destination route according to a select one of the entries, wherein:

when the IP network address matches only an entry including an enhanced interior gateway routing protocol autonomous system number corresponding to the external autonomous system, then that entry is selected; and when the IP network address matches an entry including enhanced interior gateway routing protocol autonomous system numbers corresponding to the external autonomous system and matches an entry including enhanced interior gateway routing protocol autonomous system numbers corresponding to the internal autonomous system associated with the customer edge router from which the packet traffic was received, then the entry including the enhanced interior gateway routing protocol autonomous system number associated with the customer edge router from which the packet traffic was received is selected;

routes the packet traffic to a communication system coupled to the provider edge router according to the destination route.

2. The provider edge router of claim 1, wherein each of the plurality of enhanced interior gateway routing protocol autonomous system numbers is associated with a virtual private network.

3. The provider edge router of claim 1, wherein the communication system comprises a packet switching network conforming to a multi-protocol label switching standard.

4. The provider edge router of claim 3, wherein the destination route comprises a label path route.

5. The provider edge router of claim 1, wherein the routing element selects an entry from the selected virtual routing and forwarding table having an enhanced interior gateway routing protocol autonomous system number corresponding to an internal autonomous system associated with a source of the packet traffic and at least one among a bandwidth metric and delay metric associated with the communication system.

6. A method comprising:

routing packet traffic according to one or more virtual routing and forwarding tables each having a plurality of enhanced interior gateway routing protocol autonomous system numbers;

at a provider edge router, receiving packet traffic from a select one of a plurality of customer edge routers;

selecting one of the virtual routing and forwarding tables according to its association with the select one of the plurality of customer edge routers from which the packet traffic was received;

identifying an IP network address from the packet traffic;

detecting one or more matching entries in the selected virtual routing and forwarding table that match the IP network address, at least one matching entry including one of the enhanced interior gateway routing protocol autonomous system numbers corresponding to an external autonomous system;

determining a destination route according to a select one of the entries, wherein:

when the IP network address matches only the at least one enhanced interior gateway routing protocol autonomous system number corresponding to the external autonomous system, then selecting that enhanced interior gateway routing protocol autonomous system number corresponding to the external autonomous system; and when the IP network address matches an enhanced interior gateway routing protocol autonomous system number corresponding to the external autonomous system and matches an enhanced interior gateway routing protocol autonomous system number corresponding to the internal autonomous system associated with the customer edge router from which the packet traffic was received, then selecting the enhanced interior gateway routing protocol autonomous system number associated with the customer edge router from which the packet traffic was received;

routing the packet traffic to a communication system according to the destination route;

detecting an interruption in a select one of the customer edge routers, the interruption comprising limited or no operation of the select one of the customer edge routers;

removing one or more enhanced interior gateway routing protocol autonomous system numbers from one of the virtual routing and forwarding tables associated with the affected customer edge router;

advertising the removal of one or more enhanced interior gateway routing protocol autonomous system numbers from one of the virtual routing and forwarding tables to one or more network elements of the communication system; and checking for routing updates received from the select one of the customer edge routers, and if an update is received, updating the virtual routing and forwarding table associated with the select one of the customer edge routers and advertising the update to the communication system.

7. The method of claim 6, wherein each of the plurality of enhanced interior gateway routing protocol autonomous system numbers is associated with a virtual private network.

8. The method of claim 6, wherein the communication system comprises a packet switching network conforming to a multi-protocol label switching standard, and wherein the destination route comprises a label path route.

9. The method of claim 6, comprising selecting an entry from the selected virtual routing and forwarding table having an enhanced interior gateway routing protocol autonomous system number corresponding to an internal autonomous system associated with the customer edge router transmitting the packet traffic and at least one among a bandwidth metric and delay metric associated with the communication system.

10. The method of claim 6, comprising:

receiving a routing update from a select one of the customer edge routers; and updating at least one enhanced interior gateway routing protocol autonomous system number in one of the virtual routing and forwarding tables associated with the customer edge router according to the routing update.

* * * * *